United States Patent [19]

Nakamura et al.

[11] 4,291,662
[45] Sep. 29, 1981

[54] COMBUSTION CHAMBER OF AN INTERNAL COMBUSTION ENGINE EQUIPPED WITH AN AUXILIARY COMBUSTION CHAMBER

[75] Inventors: Norihiko Nakamura, Mishima; Kiyoshi Nakanishi; Takashi Kato, both of Susono, all of Japan

[73] Assignee: Toyota Jidosha Kogyo Kabushiki Kaisha, Toyota, Japan

[21] Appl. No.: 43,794

[22] Filed: May 30, 1979

[30] Foreign Application Priority Data

Jul. 20, 1978 [JP] Japan .................................. 53/87665

[51] Int. Cl.³ .................................................. F02B 23/08
[52] U.S. Cl. ...................................... 123/661; 123/262; 123/287
[58] Field of Search .............. 123/30 C, 30 D, 191 R, 123/191 M, 191 S, 193 R, 193 P, 193 H, 193 CH, 193 CP, 661, 287, 657, 262

[56] References Cited

U.S. PATENT DOCUMENTS

| | | | |
|---|---|---|---|
| 4,106,467 | 8/1978 | Tanahashi | 123/191 S |
| 4,128,081 | 12/1978 | Noguchi et al. | 123/262 |
| 4,182,279 | 1/1980 | Sato et al. | 123/191 S |

FOREIGN PATENT DOCUMENTS 73071  7/1953  Netherlands ..................... 123/661

*Primary Examiner*—Craig R. Feinberg
*Attorney, Agent, or Firm*—Stevens, Davis, Miller & Mosher

[57] ABSTRACT

An internal combustion engine comprises a main combustion chamber and an auxiliary combustion chamber which are interconnected to each other via a connecting passage. The spark plug is arranged in the connecting passage. The engine further comprises a first raised portion formed on the inner wall of the cylinder head, a second raised portion formed on the top face of the piston at a position opposite to the first raised portion with respect to the axis of the piston, and a third raised portion formed on the inner wall of the cylinder head above the second raised portion. A first flat squish area is formed between the flat peripheral top face of the piston and the flat bottom face of the first raised portion. A second spherical shell shaped squish area is formed between the spherical bottom wall of the third raised portion and the spherical rear face of the second raised portion. The axis of the connecting passage is located in the extension of the second squish area.

10 Claims, 7 Drawing Figures

COMBUSTION CHAMBER OF AN INTERNAL COMBUSTION ENGINE EQUIPPED WITH AN AUXILIARY COMBUSTION CHAMBER

DESCRIPTION OF THE INVENTION

The present invention relates to a construction of the combustion chamber of an internal combustion engine.

As a method of simultaneously reducing the amount of harmful HC, CO and $NO_x$ components in the exhaust gas, a method of using a lean air-fuel mixture has been known. In addition, as a method of reducing the amount of harmful $NO_x$ components in the exhaust gas, a method of using a mixture containing the recirculated exhaust gas therein has been known. However, in either the case wherein a lean air-fuel mixture is used or the case wherein a mixture containing the recirculated exhaust gas therein is used, a problem occurs in that, since the flame speed of either mixture is very low and the burning velocity is thus low, a stable combustion cannot be obtained. In order to obtain a stable combustion by using a lean air-fuel mixture or a mixture containing the recirculated exhaust gas therein, it is necessary to increase the burning velocity. As an engine capable of increasing the burning velocity, the inventor has proposed an engine in which a combustion chamber comprises a main combustion chamber and an auxiliary combustion chamber, which are interconnected to each other via a connecting passage, and a spark plug is arranged in the connecting passage. In this engine, the mixture forced into the auxiliary combustion chamber from the main combustion chamber during the compression stroke is ignited by the spark plug and, thus, the burning jet is injected into the main combustion chamber from the auxiliary combustion chamber. In the above-mentioned engine, it is true that, since the space around the spark gap of the spark plug is scavenged by the mixture flowing in the connecting passage during the compression stroke, ease of ignition can be ensured, and that, since a turbulence is caused in the main combustion chamber by the burning jet injected from the auxiliary combustion chamber, the burning velocity can be increased. However, since it is impossible to cause a strong turbulence in the main combustion chamber only by the burning jet injected from the auxiliary combustion chamber, a satisfactory high burning velocity cannot be obtained. As an engine capable of creating a strong turbulence in the main combustion chamber, the inventor has proposed an engine equipped with an auxiliary combustion chamber, which is capable of creating a swirl motion rotating about the horizontal axis in the main combustion chamber due to the squish flow. This engine comprises a first downwardly projecting raised portion formed on the periphery of the inner wall of the cylinder head and having a flat bottom face so as to form a first squish area between the flat bottom face of the first raised portion and a flat peripheral portion of the top face of the piston when the piston approaches the top dead center. In addition, this engine further comprises a second upwardly projecting raised portion formed on the top face of the piston at a position opposite to the flat peripheral portion of the top face of the piston with respect to the axis of the cylinder so as to form a second squish area between the inner wall of the cylinder head and the rear face of the second raised portion when the piston aproaches the top dead center. In addition, in this engine, the second raised portion has an inclined front face which is exposed to the combustion chamber and is smoothly connected to the flat peripheral portion of the piston, and the opening of the connecting passage is directed to the central portion of the front face of the second raised portion. At the end of the compression stroke, the mixture forced into the auxiliary combustion chamber from the main combustion chamber is ignited by the spark plug, and the burning jet is injected from the connecting passage towards the front face of the second raised portion of the piston. In the above-mentioned engine, since a strong turbulence is caused in the main combustion chamber by both the burning jet and the squish flow, the burning velocity can be considerably increased.

In the past, it has been considered that the cooling operation of the combustion gas within the auxiliary combustion chamber has a great influence on the thermal efficiency of an engine. Consequently, the auxiliary combustion chamber of a conventional engine is so designed that it has a construction capable of ensuring as complete as possible heat insulation for preventing the heat of the combustion gas from dissipating. However, as a result of experiments conducted by the inventor, it has been proven that when the burning jet impinges upon the top face of the piston, the cooling operation of the burning jet, which is caused by the piston, rather than the cooling operation of the combustion gas within the auxiliary combustion chamber, has a great influence on the thermal efficiency of an engine. Consequently, when the engine is so constructed that the opening of the connecting passage is directed to the front face of the second raised portion of the piston, and thus the burning jet is cooled by the piston, the thermal efficiency becomes low and, as a result, a satisfactory good specific fuel consumption cannot be obtained.

An object of the present invention is to provide an internal combustion engine capable of obtaining a stable combustion and improving the specific fuel consumption by eliminating the cooling operation of the burning jet, which is caused by the piston, while ensuring a high burning velocity.

According to the present invention, there is provided an internal combustion engine comprising: a cylinder block having a cylinder bore therein; a cylinder head mounted on said cylinder block and forming therein an auxiliary combustion chamber; a first raised portion having on its lower end a flat bottom face and being formed on the periphery of an inner wall of said cylinder head so as to project downwards; a piston reciprocally movable in said cylinder bore and having a top face which has a flat peripheral portion approachable to said flat bottom face so as to create a first squish area therebetween at the end of the compression stroke for spouting out a first squish flow along the top face of said piston, the inner wall of said cylinder head and the top face of said piston defining therebetween a main combustion chamber connected to said auxiliary combustion chamber via a connecting passage; an intake valve movably mounted on said cylinder head for leading a combustible mixture into said main combustion chamber; an exhaust valve movably mounted on said cylinder head for discharging exhaust gas into the atmosphere; a second raised portion formed on the top face of said piston at a position opposite to said first raised portion with respect to an axis of said piston and having a rear face and a front face exposed to said main combustion chamber, said rear face being approachable to the inner wall of said cylinder head so as to create a second squish area therebetween at the end of th compression stroke for spouting out a second squish flow which moves forward in the upper interior of said combustion chamber in the direction opposite to the spouting direction of said first squish flow, said first and second squish flows cooperating with each other to create a strong swirl motion rotating about a horizontal axis in said main combustion chamber, and; a spark plug arranged in said connecting passage, wherein the improvement comprises a third raised portion formed on the inner wall of said cylinder head above said second raised portion and having a bottom wall which cooperates with said rear face of said second raised portion for creating said second squish area therebetween, an axis of said connecting passage being located in an extension of said second squish area.

The present invention may be more fully understood from the description of preferred embodiments of the invention set forth below, together with the accompanying drawings.

DESCRIPTION OF PREFERRED EMBODIMENTS

Figure 1:
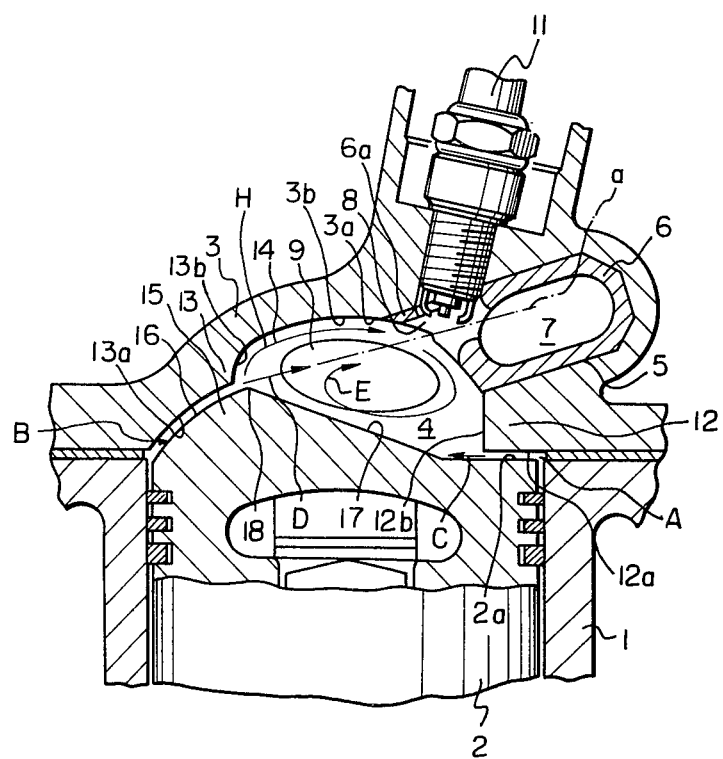
FIG. 1 is a cross-sectional side view of an embodiment an internal combustion engine according to the present invention.
Figure 2:
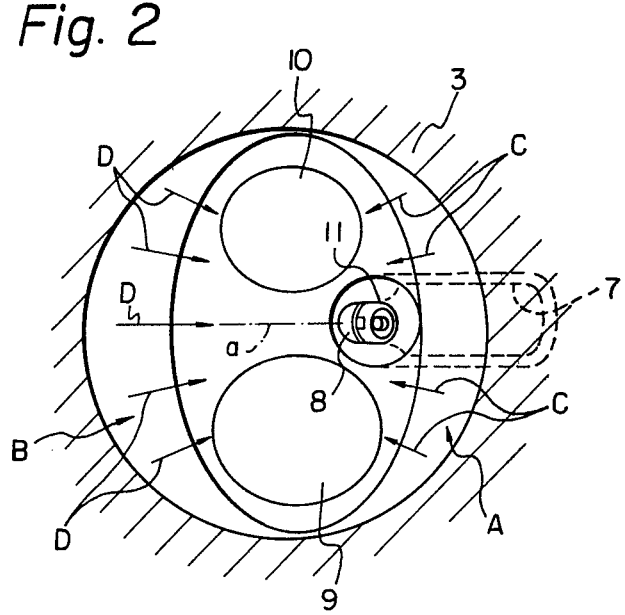
FIG. 2 is a bottom view of the cylinder head illustrated in FIG. 1.
Figure 3:
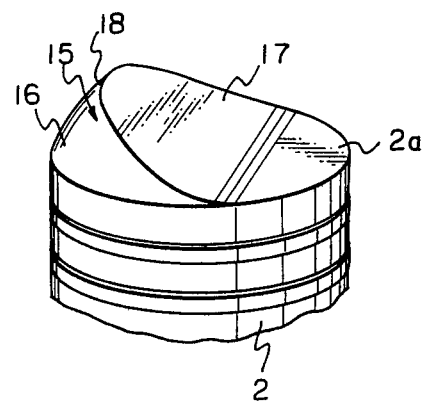
FIG. 3 is a perspective view of the piston illustrated in FIG. 1.

Referring to FIGS. 1 and 2, 1 designates a cylinder block, 2 a piston reciprocally movable in the cylinder block 1, 3 a cylinder head fixed onto the cylinder block 1 and 4 a main combustion chamber formed between the top face of the piston 2 and the inner wall 3a of the cylinder head 3. 5 designates a recess formed on the inner wall 3a of the cylinder head 3, 6 an auxillary chamber component press-fitted into the recess 5, 7 an auxiliary combustion chamber formed in the auxiliary chamber component 6 and 8 a connecting passage formed in the auxiliary chamber component 6. 9 designates an intake valve, 10 an exhaust valve and 11 a spark plug. The main combustion chamber 4 and the auxiliary combustion chamber 7 are fluidly interconnected to each other via the connecting passage 8, and the electrode of the spark plug 11 is arranged within the connecting passage 8. As is illustrated in FIG. 1, a downwardly projecting first raised portion 12 is formed on the periphery of the inner wall 3a of the cylinder head 3, and a downwardly projecting second raised portion 13 is formed on the inner wall 3a at a position opposite to the first raised portion 12 with respect to the axis of the piston 2, and the bottom wall 13a of the second raised portion 13 has a spherical shape. In addition, the second raised portion 13 has a steeply inclined side wall 13b extending upwards from the inner edge of the bottom wall 13a, and the side wall 13b is smoothly connected to the top face 3b of the main combustion chamber 4. Consequently, a depression 14 extending from the side wall 13b to the inner end portion 6a of the auxiliary chamber component 6 is formed on the inner wall 3a of the cylinder head 3.

The first raised portion 12 has a flat bottom face 12a and a substantially vertically extending side wall 12b, and the piston 2 has a flat peripheral portion 2a arranged to face the flat bottom face 12a of the first raised portion 12 so that, when the piston 2 is positioned at the top dead center as illustrated in FIG. 1, a flat squish area A is formed between the flat bottom face 12a of the first raised portion 12 and the flat peripheral portion 2a of the piston 2. On the other hand, a raised portion 15 is formed on the top face of the piston 2 at a position opposite to the flat peripheral portion 2a of the pisto 2 with respect to the axis of the piston 2, and the rear face 16 of the raised portion 15 has a spherical shape complementary to the shape of the bottom wall 13a of the second raised portion 13 so that, when the piston 2 is positioned at the top dead center as illustrated in FIG. 1, a spherical shell shaped squish area B is formed between the bottom wall 13a of the second raised portion 13 and the rear face 16 of the raised portion 15. In addition, the raised portion 15 of the piston 2 has an inclined front face 17 exposed to the main combustion chamber and smoothly extending from the flat peripheral portion 2a of the piston 2 to a ridge 18 of the raised portion 15. Since an engine according to the present invention has a construction as illustrated in FIG. 1, when the piston 2 approaches the top dead center, a pair of squish flows shown by the arrows C and D in FIG. 1 is spouted from the squish areas A and B, respectively, and, as is illustrated in FIG. 2, the squish flow D is spouted from the entire region of the squish area B. As is illustrated in FIGS. 1 and 2, the connecting passage 8 is so arranged that the axis a of the connecting passage 8 is located in the extension of the central portion of the squish area B.

Figure 4:
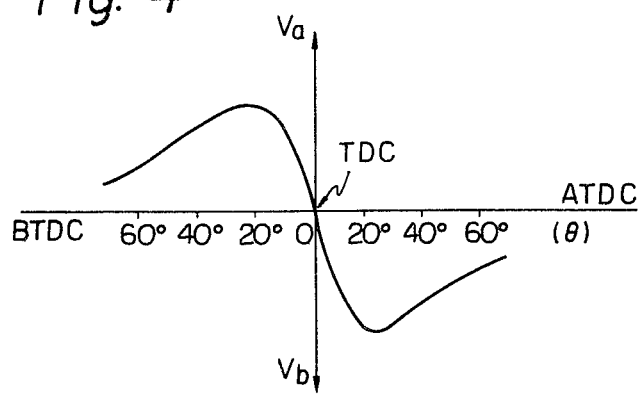
FIG. 4 is a graph showing change in the flow velocity of the squish flow.

FIG. 4 shows a flow velocity of the squish flow D, which is measured in the combustion chamber 4 at a position near the ridge 18 of the raised portion 15. In FIG. 4, the ordinate Va indicates a flow velocity of the squish flow flowing in the direction illustrated by the arrow D, in FIG. 2; the ordinate Vb indicates a flow velocity of the gas flowing towards the squish area B, in FIG. 1, in the direction which is opposite to the direction illustrated by the arrow D, and; the abscissa θ indicates crank angle. From FIG. 4, it will be understood that the spouting operation of the squish flow flowing in the direction D is started at an approximate BTDC of 60 degrees, and the flow velocity Va of the squish flow D becomes maximum at an approximate BTDC of 20 degrees. In addition, it will be also understood that the maximum flow velocity Vb of the gas flowing towards the squish area B is slightly higher than the maximum flow velocity Va of the squish flow D.

During operation, at the time of the intake stroke, when the downward movement of the piston 2 is started, the pair of gas streams flowing towards the squish areas A and B at a high speed, in directions which are opposite to those of the squish flows C and D, respectively, is created in the main combustion chamber 4 due to the temporary pressure drop within the squish areas A and B, and a strong turbulence is thus created in the main cumbustion chamber 4. As a result of this, the air-fuel ratio of a lean mixture or a mixture containing the recirculated exhaust gas therein in the main combustion chamber 4 becomes uniform over the entire region of the main combustion chamber 4. In the case wherein the mixture contains the recirculated exhaust gas therein, the air-fuel mixture is completely mixed with the recirculated exhaust gas due to the above-mentioned strong turbulence. After this, at the time of the compression stroke, when the piston 2 approaches the top dead center, the squish flows C and D are spouted from the squish areas A and B, respectively. The squish flow C spouted from the squish area A flows towards the front face 17 of the raised portion 15, and the squish flow D spouted from the squish area B moves forward towards the connecting passage 8. Since the squish flow D does not contact both the top face 3b of the main combustion chamber 4 and the front face 17 of the raised portion 15 of the piston 2, the squish flow D moves forward in the main combustion chamber 4 and, then, causes a microturbulence in the connecting passage 8. On the other hand, the squish flow C flowing towards the front face 17 of the raised portion 15 from the squish area A moves forward along the front face 17 of the raised portion 15 and, then, comes into violent contact with the squish flow D spouted from the squish area B. As a result of this violent contact, the flow direction of the squish flow D is changed so that the squish flow D flows along the top face 3b of the main combustion chamber 4, as illustrated by the arrow H in FIG. 1. At this time, since the flow direction of the squish flow C is changed by the steeply inclined side wall 13b of the raised portion 13, the squish flow C also flows along the top face 3b of the main combustion chamber 4, as illustrated by the arrow H in FIG. 1. By forming the steeply inclined side wall 13b which extends upwards from the fidge 18 of the raised portion 15, the squish flow D is not considerably decelerated by the squish flow C, and the squish flow C itself is also not considerably decelerated. Then, the squish flow H flowing along the top face 3b of the main combustion chamber 4 passes in front of the connecting passage 8 and moves downwards along the vertical side wall 12b. Thus, a strong swirl motion, shown by the arrow E, which is rotating about the horizontal axis is created in the main combustion chamber 4.

Then, the mixture is ignited by the spark plug 11. At this time, since a microturbulence is created in the connecting passage 8, as mentioned previously, the mixture is easily ignited. Then the flame rapidly spreads within the auxiliary combustion chamber 7. As a result, the mixture in the auxiliary combustion chamber 7 is rapidly burned, and a strong burning jet is injected into the main combustion chamber 4 from the connecting passage 8. Since the burning jet injected from the connecting passage 8 is pushed back by the squish flow D, and in addition, the top face 3b of the main combustion chamber 4 and the front face 17 of the raised position 15 are positioned at a position remote from the axis of the connecting possage 8, the burning jet does not impinge directly upon the top face 3b of the main combustion chamber 4 and the front face 17 of the raised portion 15. Therefore, it is possible to prevent the burning jet from being cooled by the cylinder head 3 and the piston 2. On the other hand, since a strong swirl motion E is created in the main combustion chamber 4, the flame swirls in the main combustion chamber 4 together with the strong swirl motion E and the burning velocity is thus considerably increased. In addition, since the flame swirls in the main combustion chamber 4, unburnt HC and CO located in the quench layers formed on the inner wall of the cylinder head 3 and on the top face of the piston 2 are burned. After this, when the downward movement of the piston 2 is started, the unburnt gas in the main combustion chamber 4 is sucked into the squish areas A and B together with the flame. As a result, the unburnt HC and CO located in the quench layers formed on the inner wall of the cylinder head 3 and on the top face of the piston 2 within the squish areas A and B are burned. In addition, the burned gas in auxiliary combustion chamber 7 is pulled out into the main combustion chamber 4 via the connecting passage 8 by the stream of the burned gas sucked into the squish area B, and a turbulence of the unburned gas in the main combustion chamber 4 is further caused by the burned gas thus pulled out from the auxiliary combustion chamber 7 and, at the same time, the unburned mixture in the main combustion chamber 4 is burned by this burned gas. As a result, since the duration of the injecting operation of the burning jet becomes long, the burning velocity is considerably increased.

Figure 5:
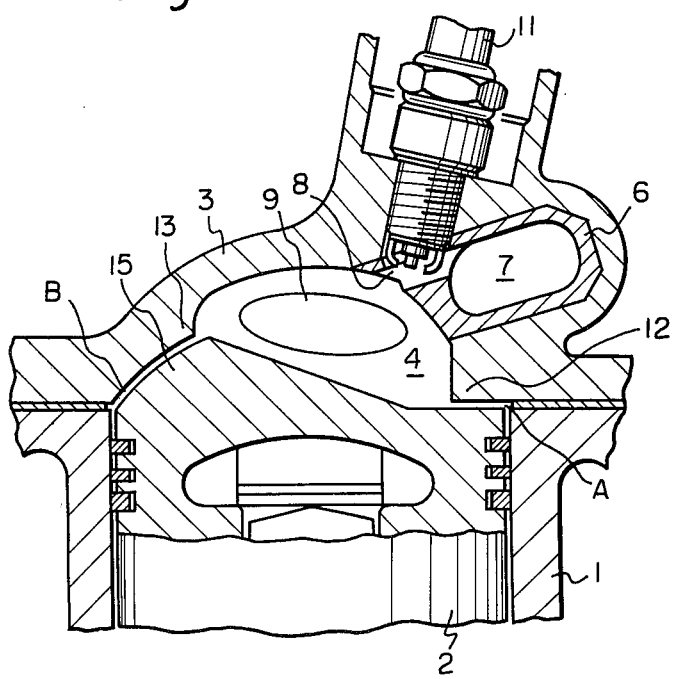
FIG. 5 is a cross-sectional side view of another embodiment according to the present invention.
Figure 6:
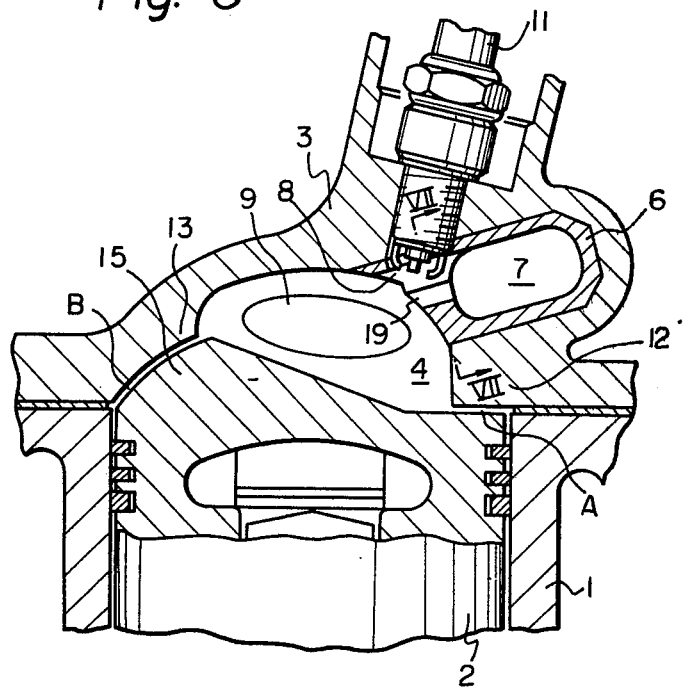
FIG. 6 is a cross-section side view of a further embodiment according to the present invention.
Figure 7:
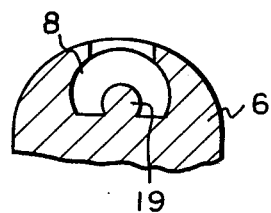
FIG. 7 is a cross-sectional view taken along the line VII—VII in FIG. 6.

In the embodiment illustrated in FIG. 1, the connecting passage 8 forms a diverging nozzle having a cross-section which is gradually increased towards the main combustion chamber 8. In this embodiment, particularly when the engine is operating under a light load, a part of the burning jet injected from the auxiliary combustion chamber 7 may move forward along the lower wall of the connecting passage 8 and be injected towards the front face 17 of the raised portion 15. The main bulk of the burning jet would still be injected at the second squish area. However, instead of adopting the connecting passage 8 illustrated in FIG. 1, the connecting passage 8 may be so formed that it has a straight passage having a uniform cross-section over its entire length as illustrated in FIG. 5, and that the connecting passage 8 has a C-shaped cross-section, as illustrated in FIGS. 6 and 7. In the embodiment illustrated in FIGS. 6 and 7, the electrode of the spark plug 11 is arranged in the upper interior of the C-shaped connecting passage 8, in FIG. 7, above a projection 19.

According to the present invention, since a strong swirl motion is created in the main combustion chamber by a pair of squish flows, the burning velocity is considerably increased. In addition, since the burning jet injected from the auxiliary combustion chamber does not impinge directly upon both the inner wall of the cylinder head and the top face of the piston, it is possible to prevent the burning jet from being cooled by the cylinder head and the piston. As a result of this, since the thermal efficiency of an engine is increased, the specific fuel consumption can be improved.

While the invention has been described with reference to specific embodiments chosen for purposes of illustration, it should be apparent that numerous modifications can be made thereto by those skilled in the art without departing from the spirit and scope of the invention.

What is claimed is:
1. An internal combustion engine, comprising:
   a cylinder block having a cylinder bore therein;
   a cylinder head mounted on said cylinder block having an auxiliary combustion chamber formed therein;
   a first raised portion formed on the periphery of an inner wall of said cylinder head so as to project downwardly, having on its lower end a flat bottom face;
   a piston reciprocally movable in said cylinder bore and having a top face which has a flat peripheral portion approachable to said flat bottom face so as to create a first squish area therebetween at the end of the compression stroke for spouting out a first squish flow along the top face of said piston;

a main combustion chamber, defined by the inner wall of said cylinder head and the top face of said piston;

a constricted connecting passage connecting said main and auxiliary combustion chambers;

an intake valve movably mounted on said cylinder head for leading a combustible mixture into said main combustion chamber;

an exhaust valve movably mounted on said cylinder head for discharging exhaust gas into the atmosphere;

a second raised portion formed on the top face of said piston at a position opposite to said first raised portion with respect to an axis of said piston and having a rear face and a front face exposed to said main combustion chamber, said rear face being approachable to the inner wall of said cylinder head so as to create a second squish area therebetween at the end of the compression stroke for spouting out a second squish flow which moves forward in the upper interior of said main combustion chamber in the direction opposite to the spouting direction of said first squish flow and at said connecting passage, said first and second squish flows cooperating with each other to create a strong swirl motion rotating about a horizontal axis in said main combustion chamber;

a spark plug arranged in said connecting passage; and a third raised portion formed on the inner wall of said cylinder head above said second raised portion and having a bottom wall which cooperates with said rear face of said second raised portion for creating said second squish area therebetween, said auxiliary combustion chamber and said connecting passage being located such that a burning jet formed in said auxiliary combustion chamber is injected into said main combustion chamber substantially directly linearly at said second squish area.

2. An internal combustion engine as claimed in claim 1, wherein said connecting passage forms a diverging nozzle.

3. An internal combustion engine as claimed in claim 1, wherein said connecting passage extends straight and has a uniform cross-section over the entire length thereof.

4. An internal combustion engine as claimed in claim 1, wherein said first raised portion has a horizontally flat bottom face and an approximately vertical side wall exposed to said main combustion chamber, said first squish area extending in a horizontal plane.

5. An internal combustion engine as claimed in claim 1, wherein said connecting passage has a C-shaped cross-section.

6. An internal combustion engine as claimed in claim 5, wherein said connecting passage has a projection formed on a lower wall thereof, said spark plug being arranged on an upper wall of said connecting passage above said projection.

7. An internal combustion engine as claimed in claim 1, wherein said bottom wall of said third raised portion has a spherical shape, said rear face of said second raised portion having a shape which is complementary to the shape of said spherical bottom wall for creating a spherical shell shaped squish area between said rear face and said spherical bottom wall.

8. An internal combustion engine as claimed in claim 7, wherein said third raised portion has a steeply inclined side wall extending upwards from a ridge of said second raised portion.

9. An internal combustion engine as claimed in claim 1, wherein said front face of said second raised portion is smoothly connected to said flat peripheral portion of the top face of said piston.

10. An internal combustion engine as claimed in claim 9, wherein said front face of said second raised portion is formed so as to be flat.

* * * * *